United States Patent
Min

(10) Patent No.: US 12,116,118 B2
(45) Date of Patent: Oct. 15, 2024

(54) ROTOR BLADE USING ADAPTIVE TRAILING EDGE ASSEMBLY

(71) Applicant: LOCKHEED MARTIN CORPORATION, Bethesda, MD (US)

(72) Inventor: Byung-Young Min, Trumbull, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/706,527

(22) Filed: Mar. 28, 2022

(65) Prior Publication Data
US 2023/0303241 A1   Sep. 28, 2023

(51) Int. Cl.
| | |
|---|---|
| *B64C 27/467* | (2006.01) |
| *B64C 9/04* | (2006.01) |
| *B64C 13/24* | (2006.01) |
| *B64C 27/615* | (2006.01) |
| *B64C 27/72* | (2006.01) |

(52) U.S. Cl.
CPC .............. *B64C 27/467* (2013.01); *B64C 9/04* (2013.01); *B64C 13/24* (2013.01); *B64C 27/615* (2013.01); *B64C 2027/7266* (2013.01)

(58) Field of Classification Search
CPC ......... B64C 27/46; B64C 27/615; B64C 9/04; B64C 13/24; B64C 2027/7261; B64C 2027/7266; B64C 2027/7272; B64C 2027/7277; B64C 2027/7283; B64C 2027/7288; F01D 5/14; F01D 5/141; F01D 5/145; F01D 5/147
See application file for complete search history.

(56) References Cited

U.S. PATENT DOCUMENTS

| | | | | |
|---|---|---|---|---|
| 4,248,572 A | * | 2/1981 | Fradenburgh | B64C 27/463 416/228 |
| 4,514,143 A | * | 4/1985 | Campbell | B64C 27/001 416/500 |
| 5,492,448 A | | 2/1996 | Perry et al. | |
| 5,588,800 A | * | 12/1996 | Charles | B64C 27/001 416/24 |
| 6,478,541 B1 | * | 11/2002 | Charles | B64C 27/615 416/23 |
| 6,497,385 B1 | * | 12/2002 | Wachspress | B64C 27/28 416/223 R |
| 7,600,976 B2 | * | 10/2009 | Bagai | B64C 27/82 416/223 R |
| 10,648,340 B2 | | 5/2020 | Darrow | |

(Continued)

*Primary Examiner* — Elton K Wong
(74) *Attorney, Agent, or Firm* — Foley & Lardner LLP

(57) ABSTRACT

A rotor blade assembly includes a rotor blade having inboard and outboard regions, a blade body, and an internal spar, the blade body defining leading and trailing edges. A trailing edge assembly extends from and is connected to the trailing edge, and has a trailing edge flap and an actuator configured to deploy the trailing edge flap between first and second positions. In one of the first and second positions, an upper surface of the trailing edge flap conforms in profile to an upper surface of the rotor blade, and in the other, the trailing edge flap is inclined relative to the blade. During hovering flight, at least one trailing edge flap segment is deflected to enhance hover performance. During forward flight, at least one trailing edge flap segment is either not deflected for reduced effect on forward flight or is deflected for additional thrust.

7 Claims, 7 Drawing Sheets

(56) References Cited

U.S. PATENT DOCUMENTS

| | | |
|---|---|---|
| 10,829,197 B2 | 11/2020 | Brewer et al. |
| 10,899,440 B2 | 1/2021 | Sargent et al. |
| 2007/0131820 A1* | 6/2007 | Chaudhry ............. B64C 27/001 244/17.25 |
| 2008/0101931 A1* | 5/2008 | Chaudhry ............. B64C 27/615 416/131 |
| 2017/0183089 A1 | 6/2017 | Hardick et al. |
| 2018/0072410 A1 | 3/2018 | Johnson |
| 2018/0339770 A1* | 11/2018 | Brunken ................ B64C 11/06 |

* cited by examiner

ROTOR BLADE USING ADAPTIVE TRAILING EDGE ASSEMBLY

FIELD

The present application relates generally to rotor blade assemblies for a rotary wing aircraft.

BACKGROUND

In rotor blade assemblies, typical rotor blade design is a compromise between forward flight performance and hover flight performance (i.e., a twist or chord distribution appropriate for hover performance may not be as preferable for forward flight, etc.). Accordingly, a rotor blade design optimized for forward flight typically shows degraded hover flight performance and is limited in high speed forward flight.

SUMMARY

The present disclosure relates to an aircraft assembly and a method thereof to provide a rotor blade conducive to forward flight while also maintaining enhanced hover performance. Particularly, such aircraft assemblies and methods thereof include a rotor blade having a deployable trailing edge assembly, which may be stowed and not deployed during forward flight and deployed during hover flight for additional lift. Such a rotor blade may be tailored for forward flight, and during hovering flight, the trailing edge assembly may be selectively deployed to provide enhanced hover flight performance.

Various embodiments provide for a rotor blade assembly connectable to a rotor hub, which rotates about an axis of rotation. In at least one embodiment, the rotor blade assembly includes a rotor blade including an inboard region, an outboard region, a blade body, and an internal spar disposed within the blade body, the blade body extending from the inboard region to the outboard region and defining a leading edge and a trailing edge; and a trailing edge assembly extending from and connected to the trailing edge of the blade body, the trailing edge assembly including a trailing edge flap comprising at least one segment and extending along the trailing edge from the inboard towards the outboard region, the trailing edge flap configured to be selectively deployed between at least a first position and a second position, and an actuator operatively coupled to the trailing edge flap and configured to selectively deploy the trailing edge flap between the first position and the second position, wherein: the trailing edge flap is configured such that, in one of the first position and the second position, an upper surface of the trailing edge flap conforms in profile to an upper surface of the rotor blade, and in the other of the first position and the second position, the trailing edge flap is inclined relative to the rotor blade.

Various embodiments provide for a trailing edge assembly for an aircraft assembly having a rotor blade that rotates about a rotational axis. In one embodiment, the trailing edge assembly includes a trailing edge flap extending along a trailing edge of the rotor blade from an inboard region of the rotor blade towards an outboard region of the rotor blade, the trailing edge flap configured to be selectively deployed between at least a first position and a second position while the rotor blade rotates about the rotational axis; and an actuator operatively coupled to the trailing edge flap and configured to selectively deploy the trailing edge flap between the first position and the second position, the trailing edge flap being configured such that, (i) in one of the first position and the second position, an upper surface of the trailing edge flap is continuous with an upper surface of the rotor blade, and a lower surface of the trailing edge flap is continuous with a lower surface of the rotor blade, and (ii) in the other of the first position and the second position, the upper and lower surfaces of the trailing edge flap are deflected at a predetermined deflection angle relative to the upper and lower surfaces of the rotor blade.

Various other embodiments provide for a method for deploying a trailing edge assembly of an aircraft assembly configured to receive a rotor blade, the rotor blade including an inboard region, an outboard region, a blade body defining a leading edge and a trailing edge, and an internal spar, and the trailing edge assembly having a trailing edge flap and an actuator, the method including: providing the trailing edge flap along the trailing edge from the inboard region towards the outboard region; operatively coupling the actuator, disposed within the blade body, to the internal spar and the trailing edge flap; and deploying, by the actuator, the trailing edge flap from one of a first position and a second position to an other of the first position and the second position by adjusting a deflection angle of the trailing edge flap.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
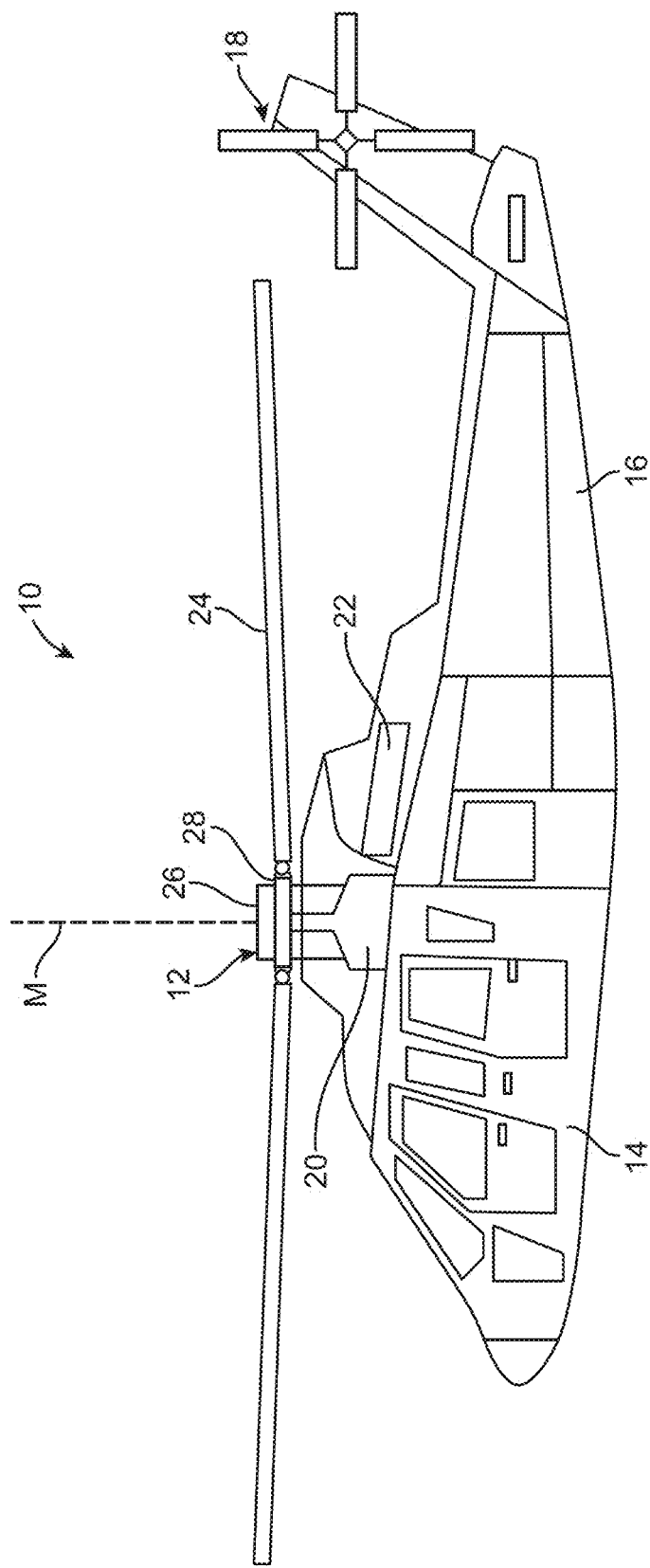
FIG. 1 is a side view of a rotary wing aircraft.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods, apparatuses, and for providing a trailing edge assembly for an aircraft assembly. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Referring to the Figures generally, various embodiments disclosed herein relate to a trailing edge assembly for an aircraft assembly. As explained in more detail herein, the trailing edge assembly uses an actuator configured for low-frequency actuation to selectively deploy a trailing edge flap to provide enhanced hover performance as needed, even when the rotor blade is designed for forward flight. Other systems employing high frequency actuators may be unreliable under rotor blade operating conditions and require more power compared to low frequency actuators because of high frequency movements. Further, unlike other systems, the trailing edge assembly is localized to the trailing edge without altering other portions of the rotor blade. In this way, its impact on the aerodynamics of other portions of the rotor blade is minimized.

Implementations described herein are related to an aircraft assembly including a hub assembly configured to receive a rotor blade. The rotor blade includes an inboard region, an outboard region, a blade body, and an internal spar disposed within the blade body. The blade body extends from the inboard region to the outboard region and defines a leading edge and a trailing edge. The aircraft assembly also includes a trailing edge assembly. The trailing edge assembly includes a trailing edge flap having at least one segment and extending along the trailing edge from the inboard region towards the outboard region. The trailing edge flap is configured to be selectively deployed between at least a first position and a second position. The trailing edge assembly also includes an actuator disposed within the blade body and operatively coupled to the internal spar and the trailing edge flap. The actuator is configured to selectively deploy the trailing edge flap between the first position and the second position. Further, the trailing edge flap is configured such that, in one of the first position and the second position, an upper surface of the trailing edge flap conforms in profile to an upper surface of the rotor blade, and in the other of the first position and the second position, the trailing edge flap is inclined relative to the rotor blade.

In consideration of the differing requirements for forward flight performance and hovering flight performance, the trailing edge assembly (e.g., active flow control device, trailing edge controller, etc.) allows for the rotor blade to be conducive to forward flight performance while also enabling enhanced hovering flight performance, when deployed. Further, unlike other systems with active flow control devices that utilize high frequency actuators, the trailing edge assembly employs an actuator configured for low frequency actuation. Accordingly, unlike high frequency actuators, the low frequency actuator does not need to make adjustments at a high frequency under rotor blade operating conditions. Consequently, the actuator requires less power than high frequency actuators and may have enhanced reliability in the rotor blade operating environment. Further still, unlike other active flow control devices, the trailing edge assembly is localized to the trailing edge such as to reduce its impact on the aerodynamics of other portions of the rotor blade.

II. Overview of Example Aircraft Assemblies

Figure 2:
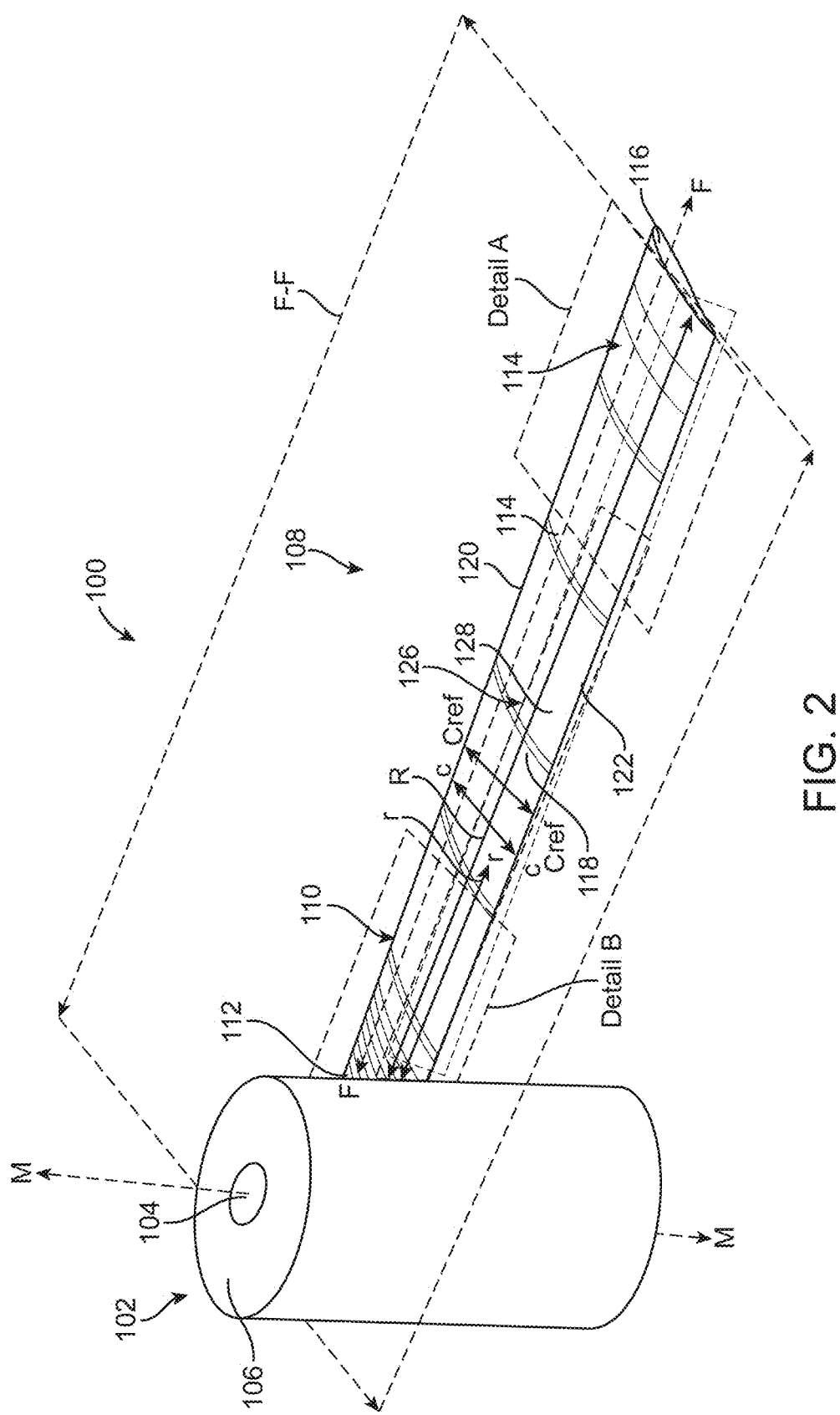
FIG. 2 is perspective view of an aircraft assembly including a rotor blade having a trailing edge assembly, according to an exemplary embodiment.
Figure 3:
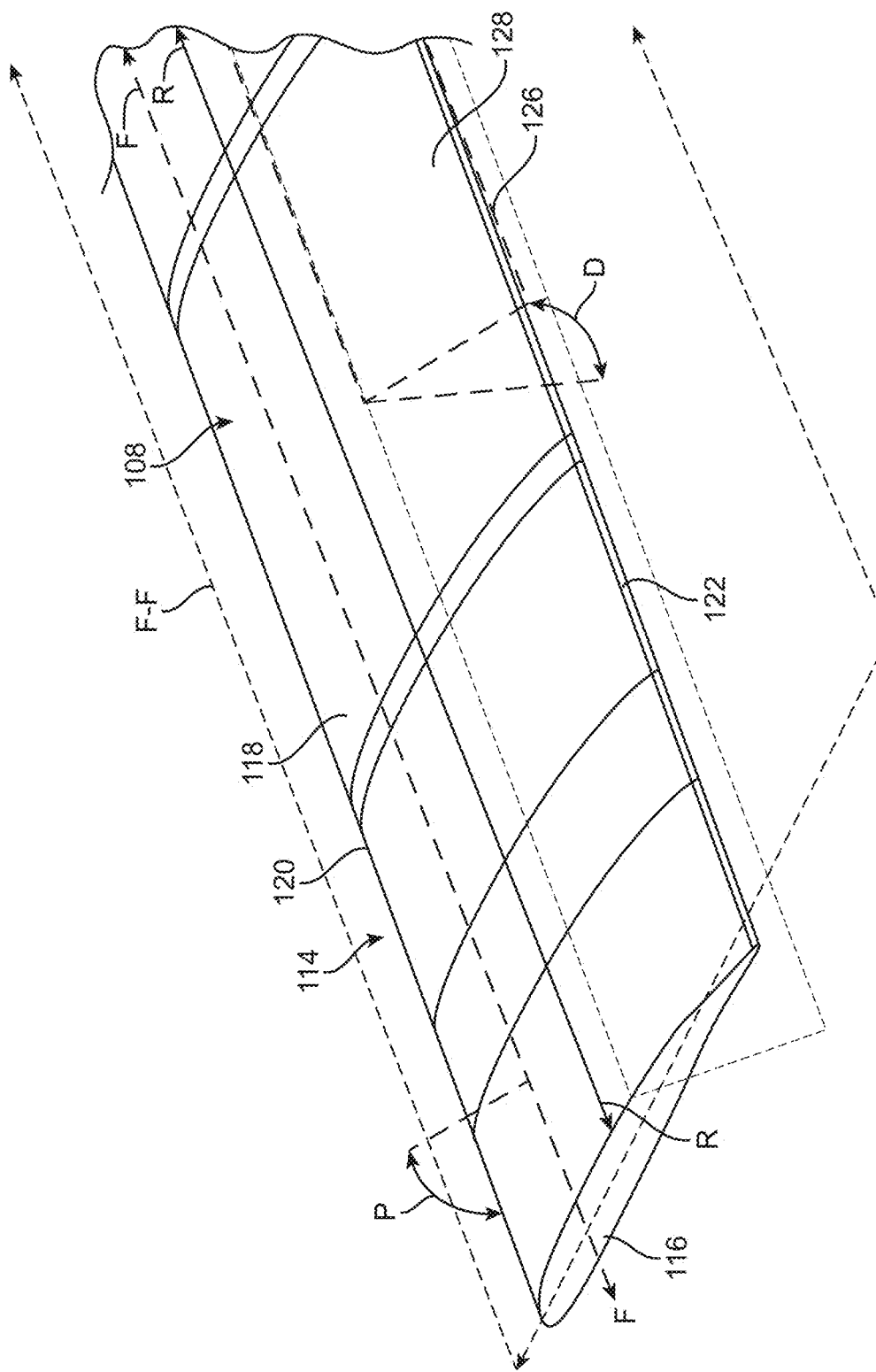
FIG. 3 is a detailed view of Detail A showing a portion of the rotor blade as shown in FIG. 2, according to an exemplary embodiment.
Figure 4:
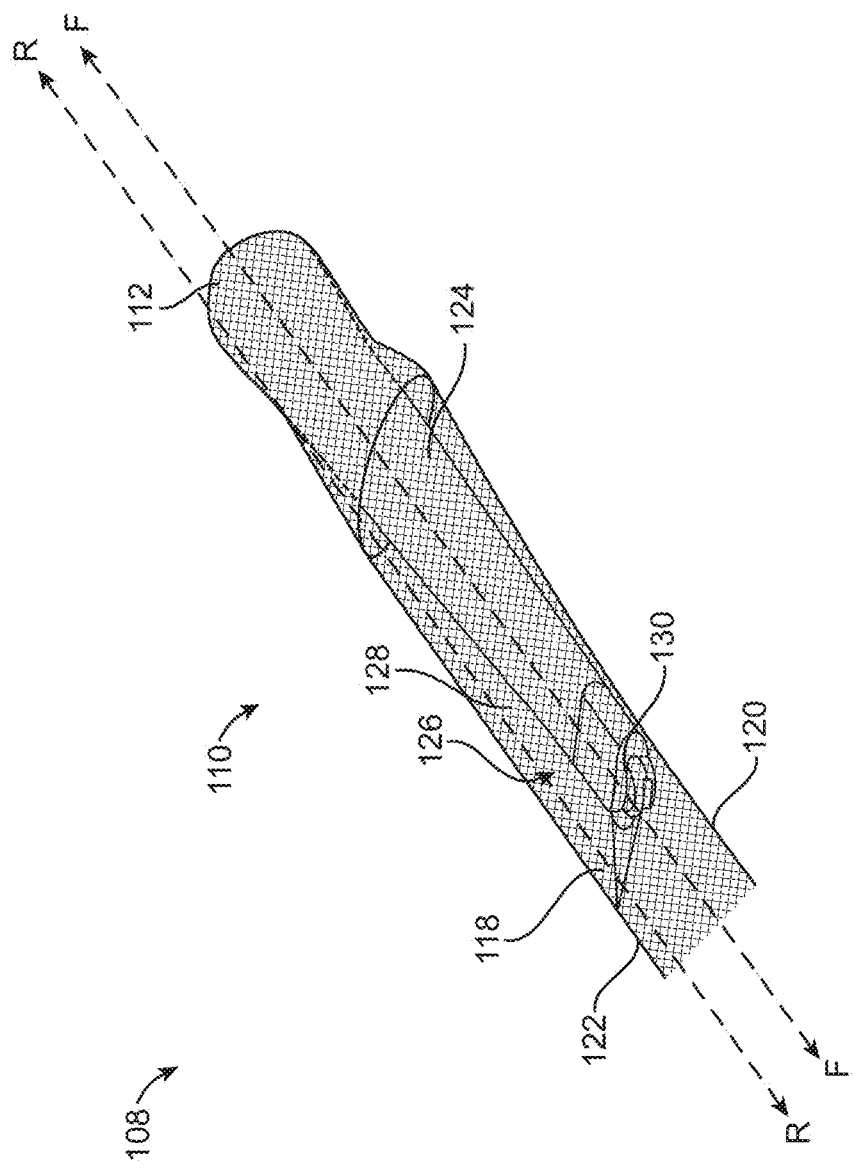
FIG. 4 is a detailed view of Detail B showing a cross-section of the rotor blade taken along reference plane Z-Z as shown in FIG. 2, according to an exemplary embodiment.

FIG. 1 is perspective view of a rotary wing aircraft 10.
FIGS. 2-4 depict an exemplary aircraft assembly 100 (e.g., rotary system, propulsion system, etc.) or portions thereof. In some embodiments, the aircraft 10 or a rotor blade 24 thereof may include one or more features described in U.S. Pat. Nos. 10,899,440 and 10,648,340, which are incorporated by reference herein in their entireties for the rotary structures and techniques described therein.

FIG. 1 depicts a rotary wing aircraft 10 (e.g., an airframe, an aircraft, a rotorcraft, etc.) having a main rotor assembly 12. The aircraft 10 includes an airframe 14 having an extending tail 16 which mounts an anti-torque system, such as a tail rotor assembly 18. The main rotor assembly 12 is driven about a rotor axis of rotation M through a transmission 20 by one or more engines 22. The main rotor assembly 12 includes a plurality of rotor blades 24 mounted to a rotor hub 26, and a swashplate 28 that is used to affect a state or orientation of the rotor blades 24. The rotor blades 24 can have a variable pitch that can be used to affect pitch and roll angles of the aircraft 10 as well as velocity of the aircraft 10. The pitch of the rotor blades 24 can be controlled by a collective control or by a cyclic control.

FIG. 2 depicts a perspective view of the aircraft assembly 100 including the rotor blade 108 having a trailing edge assembly 126, according to an exemplary embodiment. In some embodiments, the aircraft assembly 100 is the main rotor assembly 12 of FIG. 1, and the rotor blade 108 is the main rotor blade 24 of FIG. 1. The aircraft assembly 100 includes a hub system 102 (e.g., hub body, rotor hub 26, etc.) coupled (e.g., mounted, attached, fixed, welded, fastened, riveted, bonded, pinned, etc.) to, for example, the rotary wing aircraft 10 as seen in FIG. 1. In some embodiments, the hub system 102 is the rotor hub 26 as seen in FIG. 1. The hub system 102 includes a rotor mast 104 and a central hub 106 coupled to the rotor mast 104. The rotor mast 104 extends upwardly along and around the rotor axis of rotation M and is rotated about the rotor axis of rotation M relative to the aircraft 10 to rotate the central hub 106 about the rotor axis of rotation M.

Referring to FIG. 2, in some embodiments, the aircraft assembly 100 includes a rotor blade 108 (e.g., blade spar, etc.). In some embodiments, the rotor blade 108 is one of the plurality of rotor blades 24 as seen in FIG. 1. The rotor blade 108 may be made of a layered composite structure and is coupled to the central hub 106. The rotor blade 108 extends radially outward from the central hub 106 and is orthogonal to the rotor axis of rotation M. The rotor blade 108 rotates about the rotor axis of rotation M along with the central hub 106 to produce a propulsion or lift force to move, for example, the aircraft 10.

Referring to FIG. 2, in some embodiments, the rotor blade 108 includes an inboard region 110. The rotor blade 108 includes a blade root 112 at an innermost point of the inboard region 110. The rotor blade 108 is coupled to the central hub 106 at the blade root 112. The rotor blade 108 also includes an outboard region 114 and a blade tip 116 located at an outermost point of the outboard region 114. The rotor blade 108 includes a blade body 118. The blade body 118 extends from the blade root 112 to the blade tip 116 such as to define a radius R (e.g., span, etc.) of the rotor blade 108 that is orthogonal to the rotor axis of rotation M. In this way, the rotor blade 108 may also define a feathering axis F (e.g., spanwise axis, etc.) extending from the blade root 112 to the blade tip 116. The feathering axis F extends parallel to the radius R, and in some embodiments, is coincident with the radius R. The rotor blade 108 extends from the blade root 112 to the blade tip 116 such as to also define a leading edge 120 and a trailing edge 122 of the rotor blade 108. The leading edge 120 is a foremost portion of the rotor blade 108 that separates oncoming air flow. The trailing edge 122 is a rearmost portion of the rotor blade 108 at which the separated air flow meets.

Figure 5A:
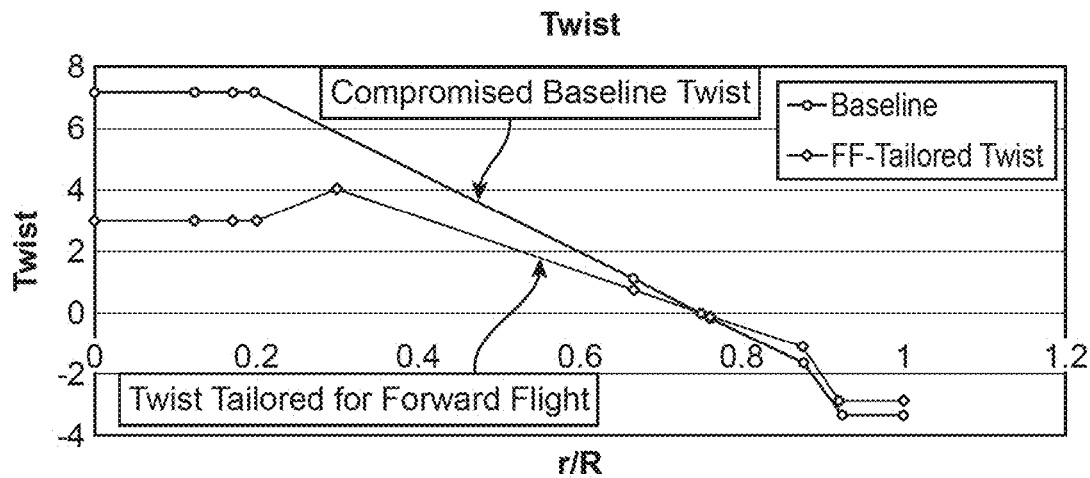
FIG. 5A is a plot comparing a twist angle at a normalized radial location r/R of the rotor blade and the rotor blade optimized for forward flight, according to an exemplary embodiment.
Figure 5B:
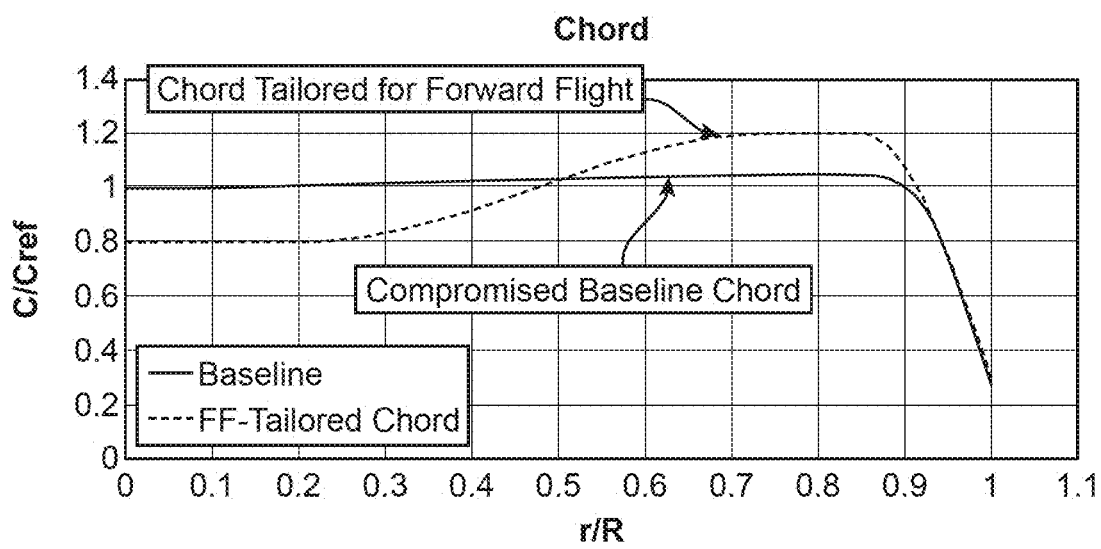
FIG. 5B is a plot comparing a normalized chord length $c/C_{ref}$ at a normalized radial location r/R of the rotor blade and the rotor blade optimized for forward flight, according to an exemplary embodiment.

FIG. 5B is a plot comparing a normalized chord length $c/C_{ref}$ at a normalized radial location r/R of the rotor blade 108 and the rotor blade 108 optimized for forward flight, according to an exemplary embodiment. Referring to FIGS. 2 and 5B, in some embodiments, the leading edge 120 and the trailing edge 122 define a chord length c of the rotor blade 108, which extends from the leading edge 120 to the trailing edge 122. The chord length c is a measurement extending between the leading edge 120 and the trailing edge 122 at a radial location r (e.g., spanwise position, etc.) of the rotor blade 108. In some embodiments, the chord length c varies from the blade root 112 to the blade tip 116. However, in some embodiments, the chord length c is constant. A normalized chord length $c/C_{ref}$ (e.g., a non-dimensional chord length, etc.) at a normalized radial location r/R (e.g., nondimensional radial location, etc.) is determined by comparing the chord length c at the radial location r to a reference chord length $C_{ref}$. For example, the normalized chord length may be expressed as $c/C_{ref}$. In some embodiments, $C_{ref}$ may be about 20 inches, about 22 inches, about 24 inches, about 26 inches, about 28 inches, or about 30 inches.

FIG. 3 depicts a detailed view of Detail A showing a portion of the rotor blade 108. Referring to FIGS. 2 and 3, under rotor blade operating conditions, a rotational velocity of the rotor blade 108 is greater at the blade tip 116 than a rotational velocity at the blade root 112. Accordingly, because lift produced by the rotor blade 108 is proportional to the rotational velocity, the rotor blade 108 may experience uneven lift distribution. To provide a more even lift distribution across the rotor blade 108, in some embodiments, the rotor blade 108 includes a varying pitch angle P. The pitch angle P is defined as an angle between the chord length c at a radial location r/R and a reference plane Z-Z, the reference plane Z-Z being a plane orthogonal to the rotor axis of rotation M and including the feathering axis F. Specifically, the pitch angle P is varied by rotating the rotor blade 108 or a portion thereof about the feathering axis F. Further, adjusting the pitch angle P changes the lift and drag of the rotor blade 108. For example, by increasing the pitch angle P, the rotor blade 108 provides more lift. Conversely, by decreasing the pitch angle P, the rotor blade 108 provides less lift. In some embodiments, the pitch angle P of the rotor blade 108 is controlled by a collective control or by a cyclic control.

In some embodiments, the rotor blade 108 may also provide a more even lift distribution by including a varying twist angle T. The twist angle T is defined as an angle between an inclination of the chord length c of the rotor blade 108 at a radial location r and an inclination (or lack thereof) of the chord length c at the blade tip 116. Varying the twist angle T deforms or twists the rotor blade 108 to provide a greater pitch angle P (and additional lift) in the inboard region 110 where the rotational velocity is lower compared to the outboard region 114 and a lower pitch angle P in the outboard region 114 where the rotational velocity is greater. Therefore, the inboard region 110 may have a larger twist angle T (as compared to other portions of the rotor blade 108) to increase the pitch angle P and produce additional lift at the inboard region 110. Conversely, the outboard region 114 may have a smaller twist angle T or no twist angle T. For example, FIG. 5A shows a plot comparing the twist angle T at a normalized radial location r/R of the rotor blade 108 and the rotor blade 108 tailored for forward flight, according to an exemplary embodiment. Referring to FIG. 5A, the twist angle T of both examples is either near or at a maximum twist angle T in a range of approximately r/R=0 to r/R=0.3 (i.e., a range extending through the inboard region 110, etc.).

Referring to FIGS. 2 and 3, in some embodiments, the rotor blade 108 may be tailored for a flight condition (e.g., forward flight, hover flight, etc.), such as by tailoring the chord length c and the twist angle T. For example, in some embodiments, the chord length c of the rotor blade 108 increases at r/R=0.3 and decreases at r/R=0.85, inclusive. In some embodiments, the twist angle T of the rotor blade 108 increases at r/R=0.2 and decreases from r/R=0.3 to r/R=0.90, inclusive. Further, the twist angle T may change from a positive value to a negative value at r/R=0.75, inclusive.

FIG. 4 depicts a detailed view of Detail B showing a cross-section of the rotor blade 108 taken along the reference plane Z-Z, as seen in FIG. 2. Referring to FIG. 4, in some embodiments, the rotor blade 108 includes an internal spar 124. The internal spar 124 is coupled to and extends radially outward from the central hub 106 and is disposed within an interior of the blade body 118. In some embodiments, the internal spar 124 and the blade body 118 may be two separate components that are attachable (e.g., removable, re-attachable, etc.) to each other. Alternatively, the internal spar 124 and the blade body 118 may be constructed as a single unitary piece or component that cannot be separated without destruction. In some embodiments, the internal spar 124 is configured to be coupled to another structure, as further discussed herein.

Referring to FIGS. 2-4, in some embodiments, the aircraft assembly 100 includes a trailing edge assembly 126. The trailing edge assembly 126 is configured to produce additional lift for the rotor blade 108 and to be selectively deployed. Accordingly, the trailing edge assembly 126 is configured to be deployed for enhanced hover performance or undeployed to enhance forward flight performance. However, the trailing edge assembly 126 may also be deployed during forward flight if additional lift or thrust is needed (e.g., to delay stall during a flight maneuver, etc.).

Referring to FIGS. 2-4, in some embodiments, the trailing edge assembly 126 includes a trailing edge flap 128. The trailing edge flap 128 extends along the trailing edge 122 of the rotor blade 108. In some embodiments, the trailing edge flap 128 extends from the inboard region 110 of the rotor blade 108 towards the outboard region 114 of the rotor blade 108. The trailing edge flap 128 may also extend from the blade root 112 toward the blade tip 116. In some embodiments, the trailing edge flap 128 extends along the trailing edge 122 from the inboard region 110 to approximately r/R=0.80, inclusive. In some embodiments, r/R may be about 0.70, about 0.75, about 0.80, about 0.85, or about 0.90, etc. Further, the trailing edge flap 128 extends along the trailing edge 122 such that an effect on other portions of the rotor blade 108 is minimized. In other words, the trailing edge flap 128 is localized to the trailing edge 122 and the surrounding area to minimize its effect on the aerodynamics of other portions of the rotor blade 108.

Referring to FIG. 2-4, in some embodiments, the trailing edge flap 128 includes at least one segment extending from the inboard region 110 towards the outboard region 114. In some embodiments, the trailing edge flap 128 extends along the trailing edge 122 such that the trailing edge flap 128 is curvilinear. However, the trailing edge flap 128 is not so limited in shape and may other shapes (e.g., rectangular, etc.). The trailing edge flap 128 may have a shape defined by a plurality of segments extending from the inboard region 110 towards the outboard region 114. For example, in some embodiments, the plurality of segments may include up to 20 segments, inclusive. In some embodiments, the segments may include 18 segments, 19 segments, 20 segments, 21 segments, 22 segments, etc., or an alternative number of segments. Each segment includes a segment chord length c. In some embodiments, the segment chord length c of each segment is in a range of approximately $c/C_{ref}=0.01$ to $c/C_{ref}=0.2$, inclusive.

As described above, the trailing edge assembly 126 is configured to produce additional lift, when deployed. The trailing edge assembly 126 produces additional lift by deflecting the trailing edge flap 128 at an angle relative to the rotor blade 108. However, deploying the trailing edge assembly 126 may also produce additional drag, which may be undesirable for certain flight conditions. Referring to FIGS. 2-4, the trailing edge flap 128 is configured to be selectively deployed between at least a first position and a second position. At least one of the first position and the second position is defined as an undeployed position, and the other of the first position and the second position is defined as a deployed position. For example, assuming that the first position is defined as the undeployed position and the second position is defined as the deployed position, in the undeployed position, the trailing edge flap 128 is not deflected at an angle relative to the rotor blade 108. Thus, in the undeployed position, an upper surface of the trailing edge flap 128 is continuous with an upper surface of the rotor blade 108, and a lower surface of the trailing edge flap 128 is continuous with a lower surface of the rotor blade 108. The upper surface conforms in surface profile (e.g., with respect to a contour, etc.) to that of the rotor blade 108.

As described above, the trailing edge assembly 126 produces additional lift by deflecting the trailing edge flap 128 at an angle relative to the rotor blade 108. Referring to FIG. 3, in the deployed position, the trailing edge flap 128 is deflected at a deflection angle D (e.g., deployed angle, inclined angle, etc.) relative to the rotor blade 108. Thus, when deflected, the trailing edge flap 128 is inclined relative to an upper surface of the rotor blade 108. The trailing edge flap 128 in such a position differs in surface profile from that of the rotor blade 108. In some embodiments, the segment deflection angle D of the at least one segment is based on, at the radial location r of the at least one segment, the chord length c of the rotor blade 108 and the twist angle T of the rotor blade 108. Further, the twist angle T and/or the chord length c may vary from the blade root 112 (or the inboard region 110) to the blade tip 116 (or the outboard region 114), respectively. In some embodiments, the deflection angle D has a maximum deflection angle value of approximately 20°, inclusive. For example, the maximum deflection angle value may be about 15°, about 18°, about 20°, about 22°, or about 25°, etc. Although the discussion of the exemplary embodiment describes the trailing edge assembly 126 as having the first position and the second position, the trailing edge assembly 126 is not so limited and may include a plurality of positions.

As described above, in some embodiments, the trailing edge flap 128 includes the plurality of segments. Accordingly, each of the plurality of segments may have a segment deflection angle D. To that effect, each of the plurality of segments may be selectively deployed or individually controlled such that each segment deflection angle D is specific to each segment. For example, when the plurality of segments is in the second position, each of the plurality of segments has the segment deflection angle D. In some embodiments, a segment of the plurality of segments closest to the blade root 112 has the segment deflection angle D that is the maximum deflection angle value. As described above, the maximum deflection angle value may have a magnitude of, for example, approximately 20°, inclusive. For example, the maximum deflection angle may be about 15°, about 18°, about 20°, about 22°, or about 25°, etc. In some embodiments, the segment deflection angle D of each segment decreases as the trailing edge flap 128 extends from the inboard region 110 towards the outboard region 114. Similarly, in some embodiments, each segment deflection angle D corresponds to, at a radial location r of each segment, the chord length c of the rotor blade 108 and the twist angle T of the rotor blade 108. Further still, the chord length c and/or the twist angle T may vary from the inboard region 110 to the outboard region 114. Although the foregoing discussion of the exemplary embodiment describes the trailing edge assembly 126 as having the first position and the second position, the trailing edge assembly 126 is not so limited and may include a plurality of positions.

Referring to FIG. 4, in some embodiments, the trailing edge assembly 126 includes an actuator 130 (e.g., a controller, etc.). The actuator 130 is operatively coupled to the trailing edge flap 128 and configured to selectively deploy the trailing edge flap 128 between the first position and the second position. In some embodiments, the actuator 130 is disposed within the blade body 118 and is operatively coupled to the internal spar 124 in addition to the trailing edge flap 128. In some embodiments, the actuator 130 is configured for low-frequency actuation (i.e., a low frequency actuator, etc.). Unlike other systems utilizing active flow control devices with actuators that are continuously activated and deactivated at high frequencies, by using the low frequency actuator 130, the trailing edge assembly 126 may deploy the trailing edge flap 128 only when necessary. Accordingly, the actuator 130 may require less power as compared to other systems with actuators requiring high frequency movements. In some embodiments, the actuator 130 is configured to selectively deploy the trailing edge flap 128 to the deflection angle D. In some embodiments, the actuator 130 is configured to selectively deploy or individually control each segment of the plurality of segments. Accordingly, each segment can be deployed or deflected at a different deflection angle D to enhance flight performance.

Figure 6:
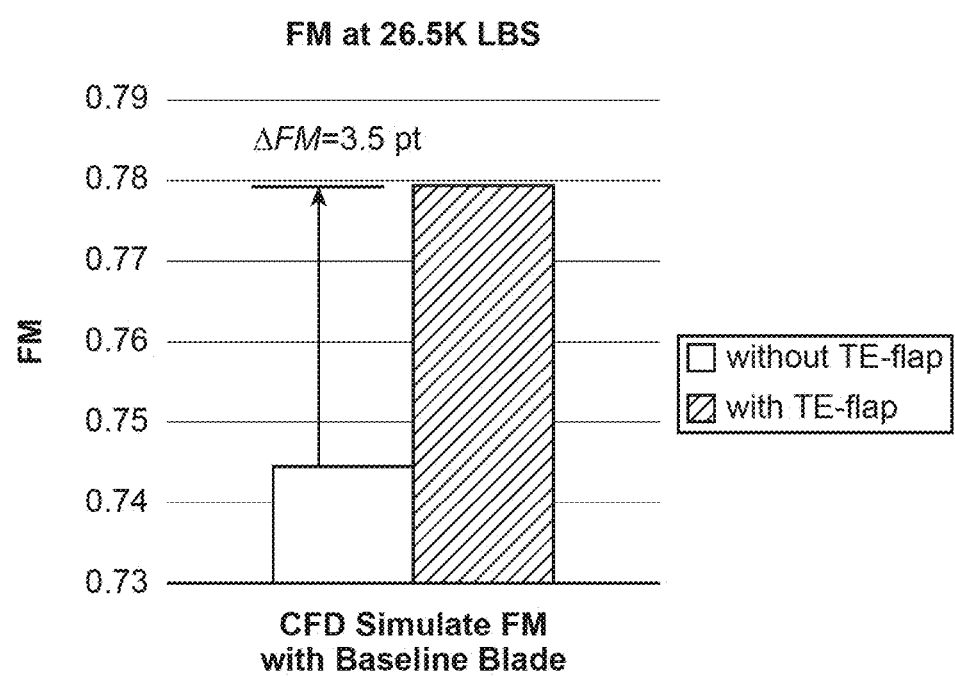
FIG. 6 is a plot comparing a figure of merit of the rotor blade with and without the trailing edge assembly, according to an exemplary embodiment.

FIG. 6 is a plot comparing a figure of merit (FM) of the rotor blade 108 with and without the trailing edge assembly 126, according to an exemplary embodiment. The FM of the rotor blade 108, a ratio of ideal power versus actual power, is a measure of rotor efficiency during hovering flight. Referring to FIG. 6, the rotor blade 108 with the trailing edge assembly 126 (FIG. 6, right column) has a FM 3.5 points higher than a FM of the rotor blade 108 without the trailing edge assembly 126 (FIG. 6, left column). In this way, FIG. 6 demonstrates that the trailing edge assembly 126 allows for the rotor blade 108 to have a design conducive to forward flight performance while also enabling enhanced hovering performance, when deployed.

III. Example Method of Deploying a Trailing Edge Assembly

Figure 7:
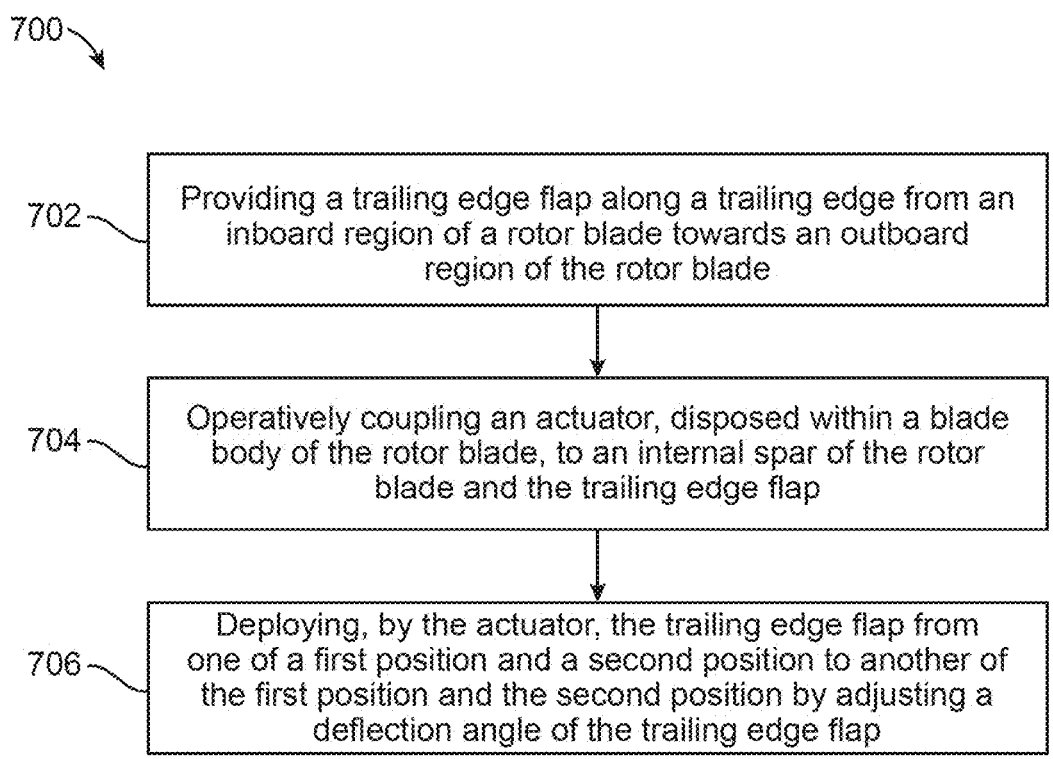
FIG. 7 is a flowchart illustrating a process for deploying the trailing edge assembly of the aircraft assembly, according to an exemplary embodiment.

FIG. 7 is a flowchart illustrating a method 700 (e.g., process, etc.) for deploying the trailing edge assembly 126 of the aircraft assembly 100. The exemplary steps described herein are illustrative in nature and the order of steps may be varied according to certain embodiments. Particular steps may be omitted or additional steps may be carried out in addition to steps explicitly identified below.

The method 700 begins (step 702) by providing the trailing edge flap 128 along the trailing edge 122 from the inboard region 110 towards the outboard region 114. In this way, the trailing edge flap 128 is localized to the trailing edge 122 of the rotor blade 108 to reduce its impact on the aerodynamics on other portions of the rotor blade 108. Further, providing the trailing edge flap 128 along the trailing edge 122 may include providing the trailing edge flap 128 with a single segment extending along the trailing edge 122, or may include a plurality of segments extending along the trailing edge 122.

The method 700 continues (step 704) by operatively coupling the actuator 130, disposed within the blade body 118, to the internal spar 124 and the trailing edge flap 128. As a result, the actuator 130 is able to selectively deploy the trailing edge flap 128.

The method 700 continues (step 706) by deploying, by the actuator 130, the trailing edge flap 128 from one of the first position and the second position to another of the first position and the second position by adjusting the deflection angle D of the trailing edge flap 128. As a result, the trailing edge assembly 126 is configured to deflect the trailing edge flap 128 to provide increased lift and thrust, such as during hovering flight.

In some embodiments, the method 700 may optionally include providing the trailing edge flap 128 with the plurality of segments extending from an innermost point of the inboard region 110 towards the outboard region 114 to approximately r/R=0.80, where R is the radius of the rotor blade 108 from the blade root 112 to the blade tip 116 and r is a radial location measured from the blade root 112. In some embodiments, the ratio r/R may differ to be in a range between about 0.7 to about 0.9. For example, r/R may be about 0.7, about 0.75, about 0.8, about 0.85, or about 0.9.

In some embodiments, the method 700 may optionally include individually deploying, by the actuator 130, each of the plurality of segments by adjusting the segment deflection angle D of each of the plurality of segments. In this way, the trailing edge assembly 126 is able to individually control and deflect each segment to provide a more tailored lift distribution along the rotor blade 108.

Further, in some embodiments, the method 700 may optionally include deploying, by the actuator 130, the trailing edge flap 128 to the first position during forward flight for enhanced forward flight. In this way, the trailing edge assembly 126 may reduce or minimize its impact on the rotor blade 108 during forward flight. Further, the method 700 may optionally include deploying, by the actuator 130, the trailing edge flap 128 to the second position during hovering flight for enhanced hover performance. Thus, the trailing edge assembly 126 may increases the lift of the rotor blade 108 during hovering flight. In some embodiments, the method 700 includes controlling the trailing edge assembly 126 such that each segment deflection angle D corresponds to, at a radial location r of each segment, the chord length c of the rotor blade 108 and the twist angle T of the rotor blade 108.

IV. Configuration of Example Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

When the language "a portion" is used, the item can include a portion and/or the entire item unless specifically stated to the contrary. Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation, e.g., ratios, angles or dimensions for length, radius, width, etc., indicates approximations which may vary by (+) or (−) 10%, 5% or 1%.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A trailing edge assembly for an aircraft assembly having a rotor blade that rotates about a rotational axis, the trailing edge assembly comprising:
a trailing edge flap extending along a trailing edge of the rotor blade from an inboard region of the rotor blade towards an outboard region of the rotor blade, the trailing edge flap configured to be selectively deployed from an undeployed position to a deployed position while the rotor blade rotates about the rotational axis, wherein the trailing edge flap is a single segment extending along the trailing edge from the inboard region to about $r/R=0.80$, where R is a radius of the rotor blade measured from an innermost point of the inboard region to an outermost point of the outboard region and r is a radial location measured from the innermost point of the inboard region; and
an actuator operatively coupled to the trailing edge flap and configured to selectively deploy the trailing edge flap from the undeployed position when the aircraft assembly is in forward flight to the deployed position when the aircraft assembly is hovering,
the trailing edge flap being configured such that
(i) in the undeployed position, an upper surface of the trailing edge flap conforms in surface profile with an upper surface of the rotor blade, and a lower surface of the trailing edge flap conforms in surface profile with a lower surface of the rotor blade such that the trailing edge flap is not deflected at an angle relative to the rotor blade, and
(ii) in the deployed position, the upper and lower surfaces of the trailing edge flap are deflected at a predetermined deflection angle relative to the upper and lower surfaces of the rotor blade,
wherein a twist angle of the rotor blade is at a maximum at about $r/R=0.3$ and decreases from approximately $r/R=0.3$ to approximately $r/R=0.9$, and
wherein a chord length of the rotor blade is constant from $r/R=0.0$ to $r/R=0.2$ and $r/R=0.75$ to $r/R=0.8$, increases between $r/R=0.3$ and $r/R=0.7$, and decreases from $r/R=0.9$ to $r/R=1$.

2. The trailing edge assembly of claim 1, wherein the trailing edge flap is curvilinear.

3. The trailing edge assembly of claim 1, wherein the trailing edge flap is maintained in the undeployed position while the aircraft assembly is in forward flight, and wherein the actuator is configured to maintain the trailing edge flap in the deployed position while the aircraft assembly is hovering.

4. A rotor blade assembly connectable to a rotor hub, which rotates about an axis of rotation, the assembly comprising:
a rotor blade comprising an inboard region, an outboard region, a blade body, and an internal spar disposed within the blade body, the blade body extending from the inboard region to the outboard region and defining a leading edge and a trailing edge; and
a trailing edge assembly extending from and connected to the trailing edge of the blade body, the trailing edge assembly comprising:
a trailing edge flap comprising a single segment extending along the trailing edge from the inboard region to about $r/R=0.80$, where R is a radius of the rotor blade measured from an innermost point of the inboard region to an outermost point of the outboard region and r is a radial location measured from the innermost point of the inboard region, the trailing edge flap configured to be selectively deployed from an undeployed position to a deployed position, and
an actuator operatively coupled to the trailing edge flap and configured to selectively deploy the trailing edge flap from the undeployed position to the deployed position:
the trailing edge flap is configured such that,
in the undeployed position, an upper surface of the trailing edge flap conforms in surface profile to an upper surface of the rotor blade, and a lower surface of the trailing edge flap conforms in surface profile to a lower surface of the rotor blade such that the trailing edge flap is not deflected at an angle relative to the rotor blade, and
in the deployed position, the trailing edge flap is inclined relative to the rotor blade,
wherein a twist angle of the rotor blade is at a maximum at about $r/R=0.3$ and decreases from $r/R=0.3$ to $r/R=0.9$, and
wherein a chord length of the rotor blade is constant from $r/R=0.0$ to $r/R=0.2$ and $r/R=0.75$ to $r/R=0.84$, increases between $r/R=0.3$ and $r/R=0.7$, and decreases from $r/R=0.9$ to $r/R=1$.

5. The rotor blade assembly according to claim 4, wherein a chord length of the rotor blade increases at $r/R=0.3$ and decreases at $r/R=0.85$.

6. The rotor blade assembly according to claim 4, wherein the twist angle changes from a positive value to a negative value at approximately $r/R=0.75$.

7. A method for deploying a trailing edge assembly of a rotor blade of an aircraft assembly, the rotor blade including an inboard region, an outboard region, a blade body defining a leading edge and a trailing edge, and an internal spar, and the trailing edge assembly having a trailing edge flap and an actuator, wherein a twist angle of the rotor blade is at a maximum at about $r/R=0.3$ and decreases from approximately $r/R=0.3$ to approximately $r/R=0.9$, where R is a radius of the rotor blade measured from an innermost point of the inboard region to an outermost point of the outboard region and r is a radial location measured from the innermost point of the inboard region, and wherein a chord length of the rotor blade is constant from $r/R=0.0$ to $r/R=0.2$ and $r/R=0.75$ to $r/R=0.84$, increases between $r/R=0.3$ and $r/R=0.7$, and decreases from $r/R=0.9$ to $r/R=1$, the method comprising:
providing the trailing edge flap along the trailing edge from the inboard region towards the outboard region, the trailing edge flap comprising a single segment extending along the trailing edge from the inboard region to about $r/R=0.80$;
operatively coupling the actuator, disposed within the blade body, to the internal spar and the trailing edge flap;

maintaining, when the aircraft assembly is in forward flight, the trailing edge flap in an undeployed position wherein an upper surface of the trailing edge flap conforms in surface profile with an upper surface of the rotor blade, and a lower surface of the trailing edge flap conforms in surface profile with a lower surface of the rotor blade; and deploying, by the actuator when the aircraft assembly is hovering, the trailing edge flap to a deployed position by adjusting a deflection angle of the trailing edge flap.

* * * * *